United States Patent [19]

Hechtl et al.

[11] 4,013,611

[45] Mar. 22, 1977

[54] PROCESS FOR PREPARING ELASTOMERS

[75] Inventors: Wolfgang Hechtl; Ernst Wohlfarth; Alois Strasser, all of Burghausen, Germany

[73] Assignee: Wacker-Chemie GmbH, Munich, Germany

[22] Filed: June 23, 1975

[21] Appl. No.: 589,282

[30] Foreign Application Priority Data

July 12, 1974  Germany ............................ 2433697

[52] U.S. Cl. ..................... 260/37 SB; 260/46.5 UA
[51] Int. Cl.² .......................................... C08L 83/04
[58] Field of Search .............. 260/37 SB, 246.5 UA

[56] References Cited

UNITED STATES PATENTS

| | | | |
|---|---|---|---|
| 3,261,802 | 7/1966 | Bobear | 260/37 SB |
| 3,699,073 | 10/1972 | Wada et al. | 260/37 SB |
| 3,732,330 | 5/1973 | Mink et al. | 260/37 SB X |
| 3,892,707 | 7/1975 | Itoh et al. | 260/46.5 UA X |

Primary Examiner—Lewis T. Jacobs

[57] ABSTRACT

An improved process for preparing compositions capable of being converted into elastomers containing (A) triorganosiloxy-terminated diorganopolysiloxanes having at least one vinyl group in each terminal unit, (B) triorganosiloxy-terminated organopolysiloxanes containing organohydrogensiloxane units and diorganosiloxane units, (C) fillers which are hydrophobic or are capable of being rendered hydrophobic and having a surface area of at least 50 m²/g and (D) catalysts which promote the addition of SiH groups to vinyl groups which comprises mixing organopolysiloxanes (B) containing organohydrogensiloxane (SiH) units with at least 75 percent by weight of the fillers (C) having a surface area of at least 50 m²/g before mixing with the organopolysiloxanes (A) having triorganosiloxy-terminal units with at least one vinyl group in each terminal unit.

13 Claims, No Drawings

PROCESS FOR PREPARING ELASTOMERS

This invention relates to a process for preparing elastomers and particularly to an improved process for preparing compositions which can be converted to elastomers. These compositions are prepared by mixing at least 75 percent by weight of a hydrophobic filler or a filler capable of being rendered hydrophobic having a surface area of at least 50 m²/g with an oganohydrogensiloxane containing SiH groups and thereafter mixing the resulting composition with an organopolysiloxane having at least one vinyl group in each terminal unit and a catalyst for promoting the addition of the SiH groups to vinyl groups.

Compositions which are capable of being converged into elastomers are described in French Pat. No. 2,029,461. This patent discloses compositions which contain triorganosiloxy-terminated diorganopolysiloxanes having at least one vinyl group in each terminal unit, organopolysiloxanes having SiH groups, hydrophobic fillers having a surface area of at least 50 m²/g and catalysts which promote the addition of the SiH groups to vinyl groups. Compared to these compositions, the compositions produced in accordance with this invention have several advantages. For example, these compositions can be poured and brushed without requiring solvents and the resulting elastomers have a surprisingly high tensile strength and tear resistance. Moreover, the fillers used in the French patent are difficult to obtain; however, these fillers are not essential in the present invention in order to achieve high tensile strength and tear resistance.

Also, German Pat. No. 2,041,633 published Apr. 5, 1973, discloses compositions that are capable of being converted to elastomers which comprises triorganosiloxy-endblocked diorganopolysiloxanes having at least one vinyl group in each terminal unit, triorganosiloxy-terminated organopolysiloxanes containing organohydrogensiloxane and diorganosiloxane units, diorganopolysiloxanes having terminal organohydrogensiloxane units, fillers having a surface area of at least 50 m²/g which have been treated with organosilicon compounds and catalysts which promote the addition of SiH groups to vinyl groups. The compositions disclosed in this publication are thixotropic, produce elastomers which have rough surfaces and contain gas bubbles whereas the compositions of this invention have the advantage that they are not thixotropic or at least less thixotropic than the compositions known heretofore. Moreover the compositions produced according to this invention produce elastomers having a smooth surface and are free of gas bubbles.

German Specification No. 2,249,822 filed Apr. 18, 1974, also discloses compositions which are capable of being converted into elastomers containing triorganosiloxy-endblocked diorganopolysiloxanes containing at least one vinyl group in the terminal groups and having a viscosity which does not exceed about 5000 cP at 25° C., organopolysiloxanes containing organohydrogensiloxane, diorganosiloxane and triorganosiloxy units containing SiH groups at the rate of one SiH group for each 5 to 100 silicon atoms and a viscosity of from 2000 to 50,000 cP at 25° C. and catalysts which promote the addition of SiH groups to vinyl groups. These compositions may also contain fillers having a surface area of at least 50 m²/g which have been treated with organosilicon compounds. Compared to the compositions described in this reference, the compositions prepared pursuant to this invention have the advantage that they can be easily poured and/or brushed on to a substrate and the resulting elastomers have better mechanical properties.

Therefore, it is an object of this invention to provide compositions which are capable of being converted into elastomers. Another object of this invention is to provide an improved process for preparing compositions capable of being converted into elastomers. Still another object of this invention is to provide compositions which can be poured and/or brushed on to substrates. Another object of this invention is to provide elastomers which have improved tensile strength and improved tear resistance. A further object of this invention is to provide elastomers which are smooth and free of gas bubbles. A still further object of this invention is to provide elastomers having better mechanical properties.

The foregoing objects and others which will become apparent from the following description are accomplished in accordance with this invention, generally speaking, by providing an improved process for preparing compositions capable of being converted into elastomers containing (A) triorganosiloxy-terminated compositions having at least one vinyl group in each terminal unit and a viscosity of from 10 to 5000 cP at 25° C., (B) organopolysiloxanes containing organohydrogensiloxane (RHSiO) units, diorganosiloxane ($R_2SiO$) units and triorganosiloxy ($R_3SiO_{1/2}$ units in which at least one Si bonded hydrogen (SiH) group is present for each 5 to 100 silicon atoms in the organopolysiloxanes (B) and having a viscosity of from 2000 to 50,000 cP at 25° C., (C) hydrophobic fillers or fillers capable of being rendered hydrophobic and having a surface area of at least 50 m²/g, and (D) catalysts which promote the addition of SiH groups to vinyl groups, the improvement which comprises mixing the organopolysiloxanes (B) and/or diorganopolysiloxanes (E) which have on the average one $CH_2=CHR_2SiO_{1/2}$ unit for each diorganohydrogensiloxane unit ($R_2HSiO_{1/2}$) unit or two diorganohydrogensiloxane units as terminal units for each molecule, with at least 75 percent by weight of the hydrophobic fillers or fillers capable of being rendered hydrophobic (C) which have a surface area of at least 50 m²/g and thereafter mixing the resultant composition with diorganopolysiloxanes (A) having triorganosiloxy-terminal units having at least one vinyl group in each terminal unit The triorganosiloxy terminated diorganopolysiloxanes (A) having at least one vinyl group in each terminal unit may be represented by the general formula

in which R above is a monovalent hydrocarbon radical or a halogenated monovalent hydrocarbon radical and n is a number whose value is such that the viscosity of the diorganopolysiloxanes (A) is from 10 to 5000 cP at 25° C. Preferably, however, the viscosity of the diorganopolysiloxanes (A) ranges from 35 to 3000 cP at 25° C.

Examples of suitable monovalent hydrocarbon radicals having up to 18 carbon atoms represented by R are alkyl radicals such as methyl, ethyl, propyl, butyl, octyl, octadecyl; aryl radicals such as phenyl and naphthyl radicals; aralkyl radicals such as benzyl, phenylethyl; alkaryl radicals such as tolyl, xylyl and ethylphenyl. Examples of suitable halogenated monovalent hydrocarbon radicals are chloromethyl, chlorophenyl, difluorophenyl and the 3,3,3-trifluoropropyl radicals. It is preferable that at least 50 percent of the R radicals in the diorganopolysiloxanes (A) be methyl radicals. However, the same or different R radicals may be linked to each silicon atom.

The diorganopolysiloxanes (A) which may be homopolymers or copolymers are known in the art and are commercially avialable. Examples of such siloxanes are dimethylsiloxanes, diethylsiloxanes, phenylmethylsiloxanes, phenylethylsiloxaness, ethylmethylsiloxanes, trifluoromethylphenylmethylsiloxanes and copolymers thereof.

Organopolysiloxanes (B) can be represented by the general formula

in which R is the same as above, R' is hydrogen or the same as R except that one hydrogen is present for each 5 to 100 silicon atoms in organopolysiloxanes (B), m is a number whose value is such that the viscosity of the organopolysiloxanes (B) is 2000 to 50,000 cP at 25° C. and preferably from 2000 to 15,000 cP at 25° C. The hydrocarbon radicals R in the diorganopolysiloxanes (B) are the same as those for organopolysiloxanes (A). Again, the methyl radical is the preferred radical. The R radical in the RHSiO units, i.e., in the RR'SiO units in which R' is hydrogen is generally a methyl radical. The R radicals in the organopolysiloxanes (B) can be the same or different. If the organopolysiloxanes (B) contain less than 1 Si-bonded hydrogen atom (SiH) for each 5 to 100 silicon atoms, then the compositions will not cross-link completely. Moreover, if the organopolysiloxanes (B) contain more than 1 Si-bonded hydrogen atom (SiH) for each 5 to 100 silicon atoms, then the elastomers produced will have unsatisfactory physical properties. Within the indicated parameters for the concentration of Si-bonded hydrogen, it is preferred that the concentration of Si-bonded hydrogen decrease when the proportion of methyl radicals to hydrocarbon radicals which are free of aliphatic unsaturation increases in organopolysiloxanes (A) and (B) as well as diorganopolysiloxanes (E) when employed. Likewise, higher concentrations of Si-bonded hydrogen are preferred when the proportion of phenyl radicals to hydrocarbon radicals free of aliphatic unsaturation increases in organopolysiloxanes (A) and (B) and diorganopolysiloxanes (E) when employed.

Organopolysiloxanes (B) are known and are commercially available. They can be produced by conventional means such as, for example, by equilibrating hydroxyl terminated diorganopolysiloxanes containing $R_2SiO$ units with an organopolysiloxane having terminal $R_3SiO_{1/2}$ units and containing RHSiO units.

Examples of fillers having a surface of at least 50 m²/g which may be used in the process of this invention are pyrogenically produced silicon dioxide (also known as "fume silica"), silicic acid hydrogels which have been dehydrated while maintaining their structure, silicic acid xerogels, pyrogenically produced aluminum oxide and pyrogenically produced titanium dioxide. Pyrogenically produced silicon dioxide, i.e., fume silica is the preferred filler. The surface area of these fillers is determined by nitrogen absorption according to the ASTM Special Technical Bulletin No. 51, 1941, page 95, and generally known as the "BET" method.

Organosilicon compounds which have been used heretofore to treat fillers to render them hydrophobic may be used in the process of this invention to form elastomers. The preferred organosilicon compounds may be represented by the general formula

in which R'' is the same as R or is a substituted hydrocarbon radical having aliphatic unsaturation, a is 1 or 2 and Z represents halogen, hydrogen, oxygen, sulfur or a radical of the formula —OH, —OR''', —NR'''X, —ONXR''', —SX, —OOCR''' and —NX—, where R''' is an alkyl radical having from 1 to 4 carbon atoms and X is hydrogen or R''. An example of a suitable hydrocarbon radical R'' having aliphatic unsaturation is the vinyl radical. Suitable examples of radicals represented by R''' are methyl, ethyl and propyl radicals.

Examples of suitable organosilicon compounds which may be used in the treatment of fillers (C) are hexamethyldisilazane, trimethylsilane, trimethylchlorosilane, trimethylethoxysilane, triorganosilylmercaptan such as trimethylsilylmercaptan, triorganosilyloxyacylate such as vinyldimethylacetoxysilane, triorganosilylamines such as trimethylsilylisopropylamine, trimethylsilylethylamine, dimethylphenylsilylpropylamine and vinyldimethylsilylbutylamine, aminoxytriorganosilanes such as diethylaminoxytrimethylsilane and diethylaminoxydimethylphenylsilane, as well as hexamethyldisiloxane, 1,3-diphenyltetramethyldisilane, 1,3-diphenyltetramethyldisilanzane and 1,3-divinyltetramethyldisiloxane.

Additional examples of organosilicon compounds from which fillers (C) are prepared through the reaction of, for instance, pyrogenically generated silicon dioxide before or during the process of this invention are dimethyldichlorosilane, dimethyldiethoxysilane, diphenyldiethoxysilane, vinylmethyldimethoxysilane, octamethylcyclotetrasiloxane and/or dimethylpolysiloxane having an Sibonded hydroxyl group in each of its terminal units and 2 to 12 silicon atoms per molecule.

The fillers (C) used in this invention may be treated with the organosilicon compounds prior to being mixed with organopolysiloxanes (B) and/or, diorganopolysiloxanes (E) or they may be treated with the organosilicon compounds while being mixed with organopolysiloxanes (B) and/or, diorganopolysiloxanes (E). Where the fillers are pretreated with the organosilicon compounds prior to being mixed with organopolysiloxanes (B) and/or diorganopolysiloxanes (E) then it is preferred that the amount of organosilicon compounds employed be in amounts of from 2 to 25 percent by weight and more preferably from 4 to 16 percent by weight based on the weight of the fillers, however, if the fillers are treated simultaneously with the process of this invention, then the organosilicon compounds are preferably employed in amounts of from 3 to 40 percent by weight and more preferably in amounts of from 6 to 25 percent by weight based on the weight of the fillers.

When the organosilicon compounds are reacted with the fillers, promoting agents or media such as water may be employed.

If the organosilicon compounds are reacted with the fillers prior to the process of this invention, the reaction can be conducted in equipment which simultaneously crushes the fillers such as ball mills or pan grinders.

The reaction of organosilicon compounds with fillers having a surface area of at least 50 m²/g in the presence or absence of high molecular weight organopolysiloxanes is generally known. Mixtures of various types of fillers may be used.

Generally, fillers (C) are employed in amounts of from 10 to 50 percent by weight and more preferably from 15 to 35 percent by weight based on the total weight of the composition to be converted into elastomers.

It is possible to use within the scope of this invention catalysts (D) which promote the addition of SiH groups to vinyl groups. Catalysts which may be employed are the same catalysts as those used heretofore in the preparation of compositions which can be converted into elastomeric or non-elastomeric compositions based on organopolysiloxanes containing vinyl groups, organopolysiloxanes containing at least 3 SiH groups per molecule and catalysts which promote the addition of the SiH groups to vinyl groups. Suitable examples of catalysts (D) which promote the addition of the SiH groups to vinyl groups are platinum, platinum on carriers such as silicon dioxide or activated charcoal and platinum compounds such as chloroplatinic acid as well as the reaction products or complexes of chloroplatinic acid with organic compounds, silicon-organic compounds and inorganic compounds. Examples of such reaction products or complexes are the reaction products of chloroplatinic acid with ketones such as cyclohexanone and platinum complexes, in which platinum is chemically linked with 1,3-divinyltetramethyldisiloxane. Generally, the platinum and platinum compounds are used in amounts of from about 0.5 to 500 ppm by weight and more preferably from about 1 to 100 ppm, calculated as platinum and based on the total weight of the compositions which are to be converted to elastomers. Other catalysts which promote the addition of SiH groups on vinyl groups are rhodium compounds, cobalt and manganese carbonyl.

In order to produce elastomers having good physical properties especially elastomers having a high resistance to tearing, it is preferred that diorganopolysiloxanes (E) be employed. Diorganopolysiloxanes (E) have on the average for each molecule a $CH_2=CHR_2SiO_{1/2}$ unit for each diorganohydrogensiloxane ($R_2HSiO_{1/2}$) or two diorganohydrogensiloxane units as terminal units. These diorganopolysiloxanes preferably have a viscosity of from 300 to 5000 cP and more preferably from 500 to 3000 c° at 25° C. The diorganopolysiloxanes (E) are preferably of the type which can be represented by either of the following formulas

or

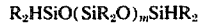

in which R is the same as R above and m is a number whose value is such that the viscosity of the diorganopolysiloxanes (E) is from 300 to 5000 cP and more preferably from 500 to 3000 cP at 25° C.

The diorganopolysiloxanes (E) can be prepared by known methods such as, for example, by the equilibration of a hydroxyl terminated diorganopolysiloxane containing $R_2SiO$ units and sym.tetramethyldihydrogendisiloxane or with a mixture consisting of equal molar amounts of sym.-tetramethydihydrogendisiloxane and sym.-divinyltetramethyldisiloxane. Diorganopolysiloxanes which have on the average for each molecule a diorganohydrogensiloxane unit and a $CH_2=CHR_2SiO_{1/2}$ unit are preferred since they enhance the formation of elastomers having especially high tear resistance.

It is preferred that organopolysiloxanes (B) and diorganopolysiloxanes (E) be employed in amounts such that the total SiH groups present are from 0.75 to 3 for each vinyl group present in the organopolysiloxanes (A) and diorganopolysiloxanes (E). Where diorganopolysiloxanes (E) are also employed then it is preferred that they be used in amounts of at least 20 percent by weight and more preferably from 50 to 400 percent by weight based on the weight of the organopolysiloxanes (B).

It is preferred that the total amount of fillers (C) which have been treated with organosilicon compounds and have a surface area of at least 50 m² /g be mixed with organopolysiloxanes (B) and/or with diorganopolysiloxanes (E) before they are mixed with the diorganopolysiloxanes (A).

Substances other than those described above may be included in the compositions of this invention. Examples of other compounds (F) are fillers having a surface area of less than 50 m²/g, pigments, soluble dyes, emulsifiers, organic compounds, agents for promoting adhesion of elastomers to substrates on which they are applied, organopolysiloxane resins and agents which retard the cross-linking process.

Examples of fillers (F) having a surface area of less than 50 m²/g are calcium carbonate, quartz powder and diatomaceous earth. An example of a suitable pigment is red iron oxide.

Emulsifiers which may be employed in the compositions of this invention are trimethylsiloxy-endblocked organopolysiloxanes which are fluid at room temperature and are free of aliphatic unsaturation and SiH groups.

An example of organic compounds which may be employed are polyvinyl chloride powders.

Examples of agents which improve adhesion of the elastomers to substrates on which they are applied are glycidyloxypropyltrialkoxysilanes, tetramethyltetrakis-(glycidyloxypropyl)cyclotetrasiloxane and methacryloxypropyltrialkoxysilane.

Organopolysiloxane resins which may be added to the compositions of this invention are copolymers containing $SiO_{4/2}$ units, $(CH_3)_3SiO_{1/2}$ units and $(CH_3)_2(CH_2=CH)SiO_{1/2}$ units in which 1.5 to 3.5 percent by weight of vinyl groups are present and a total of 0.6 to 1 $(CH_3)_3SiO_{1/2}$ units and $(CH_3)_2-(CH_2=CH)SiO_{1/2}$ units are present for each $SiO_{4/2}$ unit.

Agents which retard cross-linking of these compositions are benzotriazole and open-chain diorganopolysiloxanes having vinyl groups arranged within the chain such as those described in U.S. Pat. No. 3,699,073.

These additional substances can be mixed with the other components in any desired sequence. It is preferred, however, that they be mixed with the other components only after the organopolysiloxanes (B) and/or the diorganopolysiloxanes (E) have been mixed with at least 75 percent by weight of the fillers (C) having a surface area of at least 50 m²/g to be employed in the process of this invention.

The compositions prepared pursuant to this invention are suitable as sealing, potting or encapsulating compositions, e.g., electronic components. Also, they may be used as impression materials, as insulating materials or in the manufacture of molded articles including cable end-closures and as solvent-free coatings for fabrics.

The platinum-siloxane complex employed in the following examples was prepared by adding 20 parts by weight of sodiumhydrogen carbonate to a mixture containing 10 parts by weight of $H_2PtCl_6 \cdot 6H_2O$, 20 parts by weight of 1,3-divinyltetramethyldisiloxane and 50 parts by weight of ethanol. The mixture was heated for 30 minutes at reflux temperature with constant stirring and then allowed to stand for 15 hours before filtration. The volatile components were distilled off from the filtrate at approximately 12 mm Hg (abs.). The residue consisted of 17 parts by weight of a liquid which was dissolved in benzene. The solution was filtered and the benzene was distilled off from the filtrate. The residue was then mixed with a vinyldimethylsiloxy endblocked dimethylpolysiloxane having a viscosity of 1400 cP at 25° C. The mixing ratio was such that the mixture contained 1 percent by weight of platinum.

The tear resistance values illustrated in the following examples were determined in accordance with ASTM D-624 Form B. In these examples all parts are by weight unless otherwise specified.

EXAMPLE 1 a. About 500 parts of a hydroxyl terminated dimethylpolysiloxane having a viscosity of about 400 cP at 25° C. are mixed with 8 parts of a trimethylsiloxy-endblocked methylhydrogenpolysiloxane having a viscosity of 33 cP at 25° C. and 0.07 part of a solution containing 4 parts of a phosphorous nitrilchloride which was obtained from the reaction of 2 mols of phosphorous pentachloride and 1 mol of ammonium chloride in 13.3 parts of methylene chloride. This mixture is allowed to stand overnight at room temperature under 12 mm Hg (abs.). The solid composition thus obtained is mixed with 10 parts of a trimethylsiloxy-endblocked dimethylpolysiloxane which contains on the average approximately 12 Si-atoms per molecule and heated to 60° C. for 12 hours under constant stirring. The organopolysiloxane thus formed, consisting of methylhydrogensiloxane units, dimethylsiloxane units and trimethylsiloxy units, contains approximately 1 Si-bonded hydrogen atom for each 50 Si-atoms and has a viscosity of about 9300 cP at 25° C.

b. Approximately 1000 parts of a hydroxyl terminated dimethylpolysiloxane having a viscosity of 400 cP at 25° C. are mixed with 0.15 parts of the phosphorous nitrilchloride solution described in Example 1(a). This mixture is allowed to stand for 3 hours at 50° C. at 12 mm Hg (abs.). The solid composition thus obtained is reacted with 4.2 parts of sym.-divinyltetramethyldisiloxane and 3.1 parts of sym.-tetramethyldihydrogensiloxane and stirred for 24 hours at room temperature. The dimethylpolysiloxane thus formed has on the average one vinyldimethylsiloxane and one dimethylhydrogensiloxane terminal unit per molecule and a viscosity of 2000 cP at 25° C.

c. About 150 parts of the organopolysiloxane prepared in accordance with Example (a), 30 parts of hexamethyldisilazane, 10 parts of water and 150 parts of silicon dioxide produced in the vapor phase, having a surface area of about 130 m²/g, are mixed in a kneading machine. The mixture thus obtained is heated to 150° C. at 50 mm Hg (abs.) while continuing to knead in order to remove the volatile components. The mixture is then mixed, after cooling, with 300 parts of the diorganopolysiloxane prepared in accordance with Example (b) above.

Approximately 100 parts of the mixture thus obtained are mixed with 10 parts of a vinyldimethylsiloxy-endblocked dimethylpolysiloxane having a viscosity of 151 cP at 25° C. to which 30 ppm of platinum have been added in the form of the above described mixture of platinum-siloxane complex and diluent. The composition thus obtained, which is capable of being converted to an elastomer, can be easily poured or brushed. The composition is brushed onto a polished steel plate so as to form a coating approximately 2 mm thick and heated for 2 hours to 100° C. The physical properties of the film thus obtained are as follows:

| Tensile strength, kp/cm² or kg/cm² | Elongation at break, % | Tear resistance, kp/cm or kg/cm | Hardness Shore A |
| --- | --- | --- | --- |
| 64 | 780 | 28.3 | 15 |

EXAMPLE 2 a. About 1000 parts of a hydroxyl terminated diorganopolysiloxane consisting of 90.8 mol percent of dimethylsiloxane units and 9.2 mol percent diphenylsiloxane units and having a viscosity of 110 cP at 25° C. are mixed with 46.9 parts of a trimethylsiloxy-endblocked methylhydrogenpolysiloxane having a viscosity of 33 cP at 25° C. and 0.15 part of the phosphorous nitrilchloride solution described in Example 1(a). This mixture is allowed to stand overnight at room temperature and at 12 mm Hg (abs.). The composition thus obtained which is solid at room temperature is mixed with 16.9 parts of the trimethylsiloxy-endblocked dimethylpolysiloxane which has on the average about 12 Si-atoms per molecule and subsequently heated to 60° C. for 12 hours under constant stirring. The organopolysiloxane thus obtained has a viscosity of 7040 cP at 25° C. and consists of trimethylsilyloxy units, methylhydrogensiloxane units, dimethylsiloxane units and diphenylsiloxane units.

b. Approximately 700 parts of a hydroxyl terminated diorganopolysiloxane containing 90.8 mol percent of dimethylsiloxane and 9.2 mol percent of diphenylsiloxane units and having a viscosity of 110 cP at 25° C. are mixed with 0.1 part of the phosphorous nitrilchloride solution described in Example 1(a). The mixture is allowed to stand for 3 hours at 50° C. at 12 mm Hg (abs.). The composition thus obtained, which is solid at room temperature, is mixed with 4.4 parts of sym.-divinyltetramethyldisiloxane and 3.2 parts of sym.-tetramethyldihydrogendisiloxane and stirred for 24 hours at room temperature. The diorganopolysiloxane thus formed contains dimethylsiloxane and diphenylsiloxane units having on the average one vinyldimethylsiloxane and one dimethylhydrogensiloxane unit as terminal units per molecule and a viscosity of 1300 cP at 25° C.

c. A mixture containing 150 parts of the organopolysiloxane prepared in accordance with (a) above, 70 parts of the diorganopolysiloxane prepared in accordance with (b) above, 30 parts of hexamethylsilazane and 10 parts of water and 220 parts of silicon dioxide produced in the vapor phase and having a surface area of 130 m²/g is mixed in a kneading machine. The mixture is heated to 150° C. at 50 mm Hg (abs.) to remove the volatile components during kneading. About 230 parts of the diorganopolysiloxane prepared in accordance with (b) above and about 100 parts of a vinyldimethylsiloxy-endblocked diorganopolysiloxane containing 90.8 mol percent of dimethylsiloxane and 9.2 mol percent of diphenylsiloxane units and a viscosity of 405 cP at 25° C. are added to the mixture prior to cooling.

Approximately 90 parts of the mixture thus obtained are mixed with 10 parts of a vinyldimethylsiloxy-endblocked diorganopolysiloxane containing 90.8 mol percent of dimethylsiloxane and 9.2 mol percent of diphenylsiloxane units and having a viscosity of 405 cP at 25° C. which has previously been mixed with 10 ppm platinum in the form of the previously described mixture of platinum-siloxane complex and diluent. The resulting compound which is capable of being converted to an elastomer can be easily poured and brushed. A film prepared in accordance with Example 1 has the following physical properties:

| Tensile strength, kp/cm² or kg/cm² | Elongation at break, % | Tear resistance, kg/cm or kg/cm | Hardness, Shore A |
|---|---|---|---|
| 52 | 300 | 10.5 | 31 |

Although specific examples of the invention have been described herein, it is not intended to limit the invention solely thereto, but to include all the variations and modifications falling within the scope of the appended claims.

What is claimed is:

1. An improved process for preparing compositions capable of being converted into elastomers comprising (A) triorganosiloxy-terminated diorganopolysiloxanes having at least one vinyl group in each terminal unit and a viscosity of from 10 to 5000 cP at 25° C., (B) organopolysiloxanes having from 2000 to 50,000 cP at 25° C., said organopolysiloxanes (B) containing organohydrogensiloxane units of the formula RHSiO, diorganosiloxane units of the formula $R_2SiO$ and triorganosiloxy terminal units of the formula $R_3SiO_{1/2}$, in which R is selected from the group consisting of monovalent hydrocarbon radicals and halogenated monovalent hydrocarbon radicals, (C) fillers capable of being rendered hydrophobic and having a surface area of at least 50 m²/g and (D) catalysts which promote the addition of SiH groups to vinyl groups, the improvement which comprises mixing the organopolysiloxanes (B) with at least 75 percent by weight of fillers (C) having a surface area of at least 50 m²/g prior to mixing the above mixture with organopolysiloxanes (A) and catalysts (D).

2. The process of claim 1 wherein the fillers (C) are mixed with organopolysiloxane (B) and diorganopolysiloxanes (E) having on the average for each molecule terminal units selected from the class consisting of a $CH_2=CHR_2SiO_{1/2}$ unit and a diorganohydrogensiloxane unit of the formula $R_2HSiO_{1/2}$, in which one diorganohydrogensiloxane unit is present for each $CH_2=CHR_2SiO_{1/2}$ unit or two diorganohydrogensiloxane units prior to mixing the above mixture with organopolysiloxanes (A) and catalysts (D).

3. The process of claim 2 wherein the diorganopolysiloxanes (E) have a viscosity of from 300 to 5000 cP at 25° C.

4. The process of claim 2 wherein the diorganopolysiloxanes (E) are used in an amount of from 50 to 400 percent by weight based on the weight of the organopolysiloxanes (B).

5. The process of claim 1 wherein the filler (C) is treated with an organosilicon compound and rendered hydrophobic prior to mixing with the organopolysiloxanes (B).

6. The process of claim 2 wherein the filler (C) is treated with an organosilicon compound and rendered hydrophobic prior to mixing with organopolysiloxanes (B) and organopolysiloxanes (E).

7. The process of claim 1 wherein the organopolysiloxanes (B) are mixed with at least 75 percent by weight of fillers (C) having a surface area of at least 50 m²/g and a sufficient amount of organosilicon compound to render the fillers (C) hydrophobic while being mixed with organopolysiloxanes (B).

8. The process of claim 7 wherein the fillers (C) are mixed with organopolysiloxanes (B), diorganopolysiloxanes (E) and a sufficient amount of organosilicon compounds to render the fillers (C) hydrophobic while being mixed with organopolysiloxanes (B) and diorganopolysiloxanes (E).

9. The process of claim 5 where the amount of organosilicon compound is present in an amount of from 2 to 25 percent by weight based on the weight of the fillers.

10. The process of claim 7 wherein the organosilicon compound is present in an amount of from 3 to 40 percent by weight based on the weight of the fillers.

11. The process of claim 2 wherein the fillers (C) are mixed with the diorganopolysiloxanes (E) having on the average for each molecule terminal units selected from the class consisting of a $CH_2=CHR_2SiO_{1/2}$ unit and a diorganohydrogensiloxane unit of the formula $R_2HSiO_{1/2}$, in which one diorganohydrogensiloxane unit is present for each $CH_2=CHR_2SiO_{1/2}$ unit or two diorganohydrogensiloxane units prior to mixing the above mixture with organopolysiloxanes (A) and (B) and catalysts (D).

12. The process of claim 2 wherein the filler (C) is treated with an organosilicon compound and rendered hydrophobic prior to mixing with the diorganopolysiloxanes (E).

13. The process of claim 2 wherein the diorganopolysiloxanes (E) are mixed with filler (C) and a sufficient amount of organosilicon compound to render the filler (C) hydrophobic while being mixed with organopolysiloxane (B).

* * * * *